United States Patent [19]

Pace

[11] Patent Number: 4,848,034
[45] Date of Patent: Jul. 18, 1989

[54] QUICK-RELEASE LATCH AND ACCESS DOOR

[75] Inventor: James W. Pace, Ft. Worth, Tex.

[73] Assignee: The Boeing Company, Seattle, Wash.

[21] Appl. No.: 198,160

[22] Filed: May 24, 1988

[51] Int. Cl.⁴ ............................................. E05C 21/02
[52] U.S. Cl. ..................................... 49/465; 292/254; 292/304; 220/298; 220/251
[58] Field of Search .................. 49/463, 465; 292/254, 292/304; 244/129.4; 220/251, 294, 298, 300

[56] References Cited

U.S. PATENT DOCUMENTS

| 603,348 | 3/1898 | Thompson . | |
|---|---|---|---|
| 1,851,570 | 3/1932 | De Mattia . | |
| 2,185,643 | 1/1940 | Meyer et al. | 292/304 |
| 2,432,457 | 12/1947 | Stevens . | |
| 2,682,211 | 6/1954 | Avila | 49/465 |
| 3,084,827 | 4/1963 | Dyer . | |
| 3,394,834 | 7/1968 | Cigliano . | |
| 3,645,418 | 2/1962 | Oberlander | 220/298 |
| 4,203,686 | 5/1980 | Bowman | 49/465 |
| 4,291,816 | 9/1981 | Lamoureux . | |

FOREIGN PATENT DOCUMENTS 63422 9/1955 France ................................ 220/298
1053889 3/1959 German Democratic Rep. .................................... 220/298

Primary Examiner—Kenneth J. Dorner
Assistant Examiner—Gerald Anderson
Attorney, Agent, or Firm—Seed and Berry

[57] ABSTRACT

A novel door assembly is provided for allowing selective access between adjacent fuel cells of an aircraft. The assembly includes a frame which is adapted to be mounted to the fuel cell rib between adjacent fuel cells. A door is provided for rotational engagement with the frame to thereby provide a sealable throughway between adjacent fuel cells. The door includes first and second handles mounted to respective first and second sides thereof. A latch is mounted to the frame for engaging the second handle to prevent clockwise rotation of the door and thereby latch the door in the sealed positioned. A novel leakage assembly is provided which is responsive to a first predetermined displacement of either the first or second handle to unlatch the door and is responsive to a second predetermined displacement of either the first or second handle to rotate the door in the clockwise direction to free the door from the frame. Accordingly, the door may be latched or unlatched from either side thereof.

20 Claims, 3 Drawing Sheets

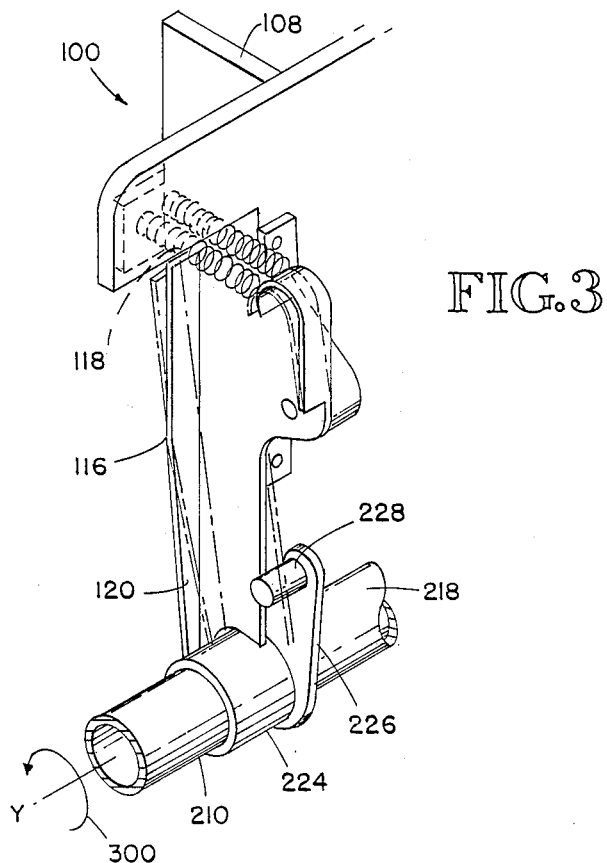

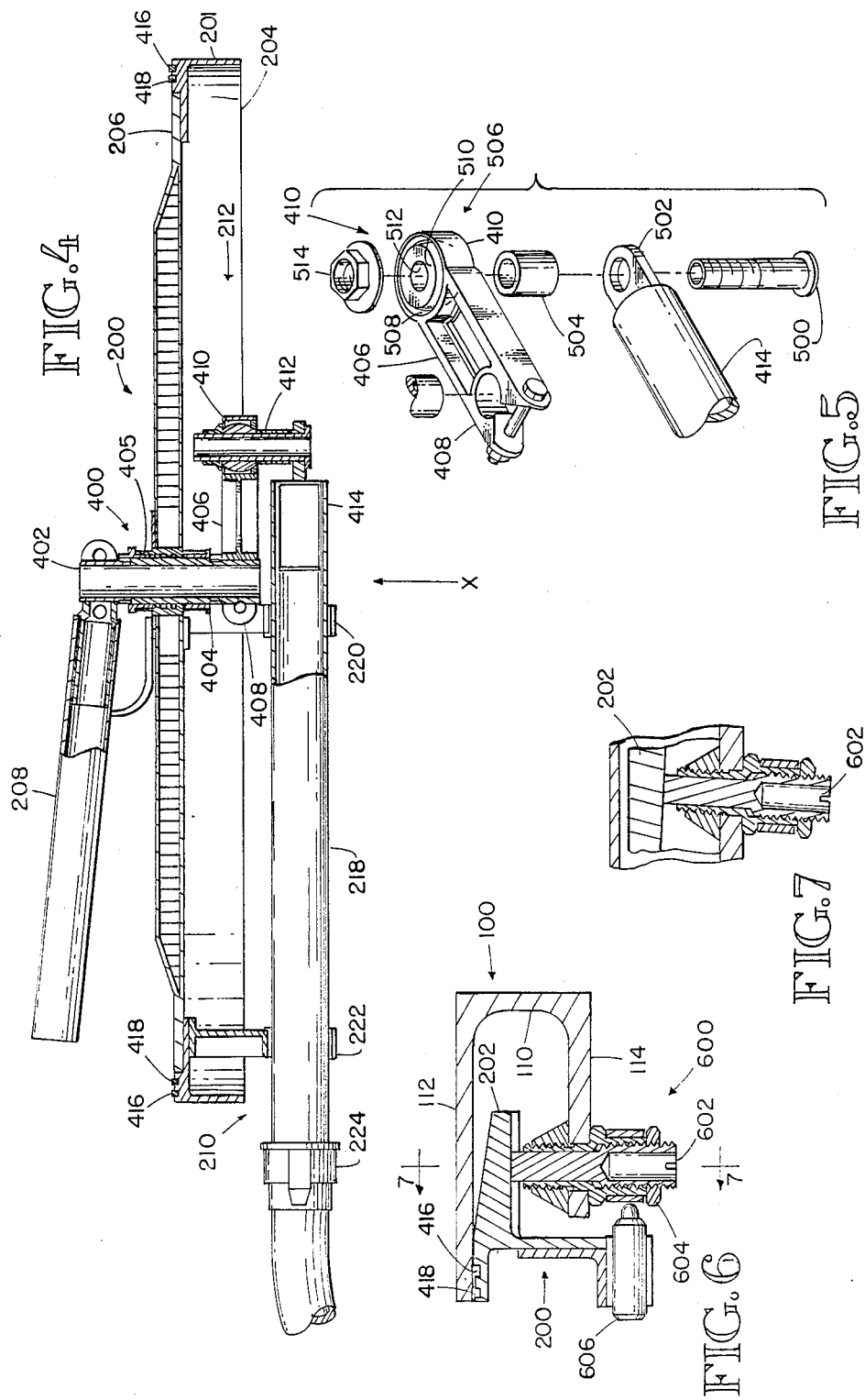

4,848,034

1

QUICK-RELEASE LATCH AND ACCESS DOOR

STATEMENT OF GOVERNMENT INTEREST

The U.S. government has rights in this application.

TECHNICAL FIELD

The present invention is directed toward access doors for use with moving vehicles and, more particularly, toward an access door for use with the fuel cell rib of aircraft.

BACKGROUND OF THE INVENTION

The fuel cell rib of aircraft typically includes a plurality of individual compartments which must be accessed after construction for routine maintenance. It is desirable to provide a sealable throughway between adjacent compartments such that the fuel may remain compartmentalized during flight and such that adjacent compartments may be accessed during maintenance.

Due to safety regulations, any means of access provided intermediate adjacent compartments must be operational from either side thereof. Additionally, it is desirable to provide a latching mechanism which will prevent unintentional opening of the access way. Since the individual fuel compartments are typically pressurized, it is desirable to provide a method for adjusting the seal of the access way to allow maximum sealing while minimizing unnecessary wear of mating parts.

DISCLOSURE OF THE INVENTION

The subject invention provides an access door assembly for a fuel cell rib, which assembly includes a latching mechanism that is operable from either side of the door assembly. A door has an exterior and an interior side and includes a shaft which extends therethrough. A frame is attachable to the fuel cell rib and includes a central opening. The door is adapted to rotationally engage and disengage the frame to provide selective access to the fuel cell. A first handle is fixedly attached to the shaft on the exterior side of the door for rotating the shaft. A latch handle is fixedly attached to the interior side of the door such that movement of the latch handle relative to the door is limited to rotation of the latch handle about its longitudinal axis and such that rotation of the latch handle about a mating axis, which mating axis is substantially transverse to the door, results in rotation of the door. The latch handle is coupled to the shaft by a linkage assembly which is adapted for rotating the latch handle about its longitudinal axis in response to a first predetermined angular rotation of the shaft about the shaft axis. The linkage means are further adapted for rotating the latch handle about the mating axis, in response to a second predetermined angular rotation of the shaft about the shaft axis, to rotate the door. A latch assembly is provided for latching the handle such that, at times when the door is latched, the door is prevented from rotating relative to the frame. The latch assembly is responsive to rotation of the latch handle about its longitudinal axis for free the latch handle such that the door is not prevented from rotation and may be thereby released.

2

Figure 2:
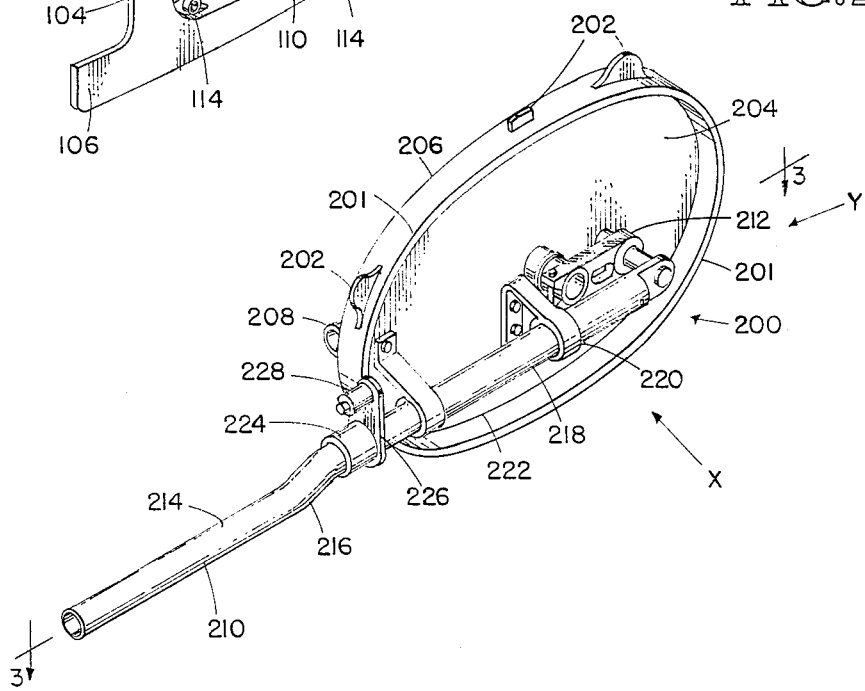

FIG. 2 is a perspective view of the door which comprises a portion of the assembly that is the subject of the present invention.

Figure 1:
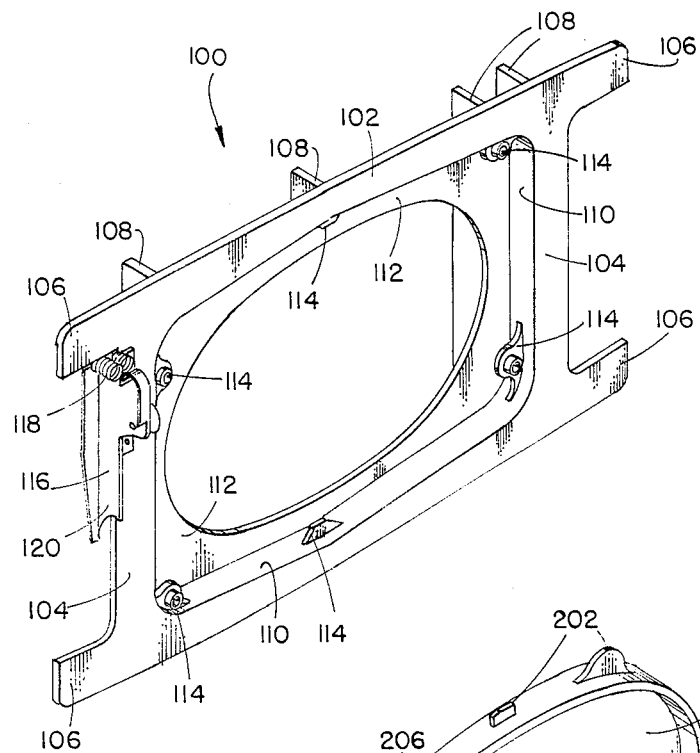
FIG. 1 is a perspective view of the frame of the door assembly.

FIG. 3 comprises a partial, perspective view illustrating the latch shown in FIG. 1.

FIG. 4 is a partial, sectional view of the door taken along lines 3—3 of FIG. 2.

FIG. 5 is a partial, exploded view of the linkage system of the subject invention.

FIG. 6 is a partial, sectional view of the tabs which are used to engage the door with the frame.

FIG. 7 is partial, sectional view taken along the lines 6—6 of FIG. 5.

BEST MODE FOR CARRYING OUT THE INVENTION

A door assembly is provided which is mounted intermediate adjacent fuel compartments of a fuel cell rib to allow access therebetween. The door assembly includes apparatus for providing a seal between adjacent compartments when the door is closed to allow the fuel compartments to be selectively pressurized as is common in aircraft operation. It will be apparent to those skilled in the art that although the invention is described herein by reference to aircraft, the subject invention may be used to provide a means of access between adjacent compartments of any moving vehicle or other structure.

The door assembly comprises a frame 100, shown in FIG. 1, and a door 200, shown in FIG. 2. The frame 100 comprises a major body portion 102 which includes a border 104 for mounting the frame to the aircraft by any suitable means. The border 104 also includes tabs 106 which may facilitate mounting the frame 100 to the aircraft. Vertical supporting struts 108 are attached to the rear of the frame 100 for adding support and rigidity thereto.

The frame 100 includes a sidewall 110 and a sealing plane 112 which define a well interior of the frame 100. The sealing plane 112 includes an opening which provides a throughway between adjacent compartments when the frame 100 is mounted. The sealing plane 112 is shaped and sized to seal with the door 200 of the assembly, as will be described in more detail below. A plurality of frame camming tab 114 are mounted to the sidewall 110 of the frame 100 in spaced relation. The frame camming tabs 114 are provided for mating with respective door camming tabs to secure the door to the frame, as will also be described in more detail below.

A latch 116 is pivotably mounted to the frame 100 by a bracket (not shown). The bracket is attached to the frame 100 in a manner such that the pivoting axis of latch 116 is parallel to the plane defined by frame 100. The latch 116 is biased with springs 118 so that a restraining portion 120 of the latch is biased out from the frame 100 as shown in FIG. 1.

FIG. 2 provides an illustration of the door 200 which is constructed for mating with the frame 100. The door 200 includes a collar 201 attached to the periphery thereof with a plurality of door camming tabs 202 spaced about the collar 201. The door 200 is secured to the frame 100 by placing the door within the well defined by the sidewall 110 and the sealing plane 112 and rotating the door counterclockwise, relative to the door frame, about a mating axis transverse to the door (labeled "X" in FIG. 2), such that the door camming tabs 202 mate with the frame camming tabs 114 to compress the door against the sealing plane 112 and thereby seal the door to the frame.

The door 200 has an exterior side 204 and an interior side 206. A handle 208 is mounted to the interior side of the door 200, as will be described in more detail below. A handle 210 which is mounted to the exterior side 204 of the door 200 and is coupled to the handle 208 by a linkage assembly 212 which will also be described in more detail below. The handle 210 includes a free end portion 214, an intermediate portion 216 and al latching end portion 218. The latching end portion 218 is fixedly attached to the door 200 by first and second brackets 220 and 222 such that movement of the latching end portion 218, relative to the door 200, is limited to rotation about the longitudinal axis of the latching end portion 218 (labeled "Y" in FIG. 2).

The intermediate portion 216 includes two angles which define a jog that offsets the longitudinal axis of the free end portion 214 from the longitudinal axis of the latching end portion 218. The jog of the intermediate portion 216 is provided to allow the latching end portion 218 to be rotated about is longitudinal axis, i.e., axis "Y", in response to displacement of the free end portion 214. It will appreciated by those skilled in the art that the intermediate portion 216 need only include a single angle to accomplish this purpose and need not include two angles as shown in FIG. 2.

An activating lever 224 is mounted to the latching end portion 218 of the handle 210. The activating lever 224 includes a projecting portion 226 which extends outward from the handle 210 and a roller assembly 228 mounted to the projecting portion 226. The activating lever 224 is provided for mating with the restraining portion 120 of the latch 116, as shown in FIG. 3. Rotation of the latching end portion 218 causes the roller assembly 228 to engage the restraining portion 120 and to displace the restraining portion away from the handle 210. Since the latch 116 is fixedly mounted to the frame 100, the handle 210 is prevented from rotating about the mating axis "X" until the latch 116 is displaced away from the activating lever 224. Hence, the latch 116 prevents clockwise rotation of the handle 210, and consequently the door 200, about the mating axis "X" when the latch 116 is engaged with the handle 210. Further, counterclockwise rotation of the door 200 is prevented by the clamping and compressing action of the door camming tabs 202 and frame camming tabs 114 as described above. However, rotation of the handle 210 about its longitudinal axis "Y" (referred to hereinafter as the latching axis) displaces the latch 116 to allow the door 200 to be rotated clockwise about the mating axis "X" and removed from the frame 100.

A particular advantage of the door assembly of the present invention is that the door assembly is adapted to be unlatched and removed from the frame from either side thereof. To unlatch the door 200 from the exterior side 204 thereof, the free end 214 of the handle 210 is displaced, resulting in rotation of the latch end portion 218 about the latching axis "Y" to displace the retraining portion 120 of the latch 116 and free the handle 210 for clockwise rotation of the door 200 about the mating axis "X". Further displacement of the free end portion 214 results in rotation of the door 200 about the mating axis "X" to free the door from the frame 100.

The door 200 may also be unlatched by rotating the handle 208. With reference to FIG. 4, the handle 208 and the handle 210 are coupled by the linkage assembly 212. The linkage assembly 212 includes a shaft 400 which extends through the door 200. The shaft 400 has an interior shaft portion 402 which projects from the interior side 206 of the door and an exterior shaft portion 404 which projects from the exterior side 204 of the door 200. The shaft 400 is mounted to the door 200 by a bearing assembly 405 such that the shaft 400 rotates freely about its longitudinal axis (referred to herein as the shaft axis), which shaft axis corresponds to the mating axis "X." It will be appreciated by those skilled in the art that although the shaft axis and the mating axis correspond in the presently preferred embodiment, the two axes may be distinct without departing from the true scope and spirit of the invention.

The handle 208 is fixedly attached to the exterior shaft portion 402 such that displacement of the handle 208 rotates the shaft about the mating axis "X." The exterior shaft portion 404 is coupled to a lever arm 406 having a clamping end 408 fixed to the exterior shaft portion 404 and an apertured end 410, remote from the clamping end 408. The apertured end 410 is arcuately displaced in response to rotation of the shaft 400 and the clamping end 408 of the lever arm 406 about the mating axis "X." The apertured end 410 of the lever arm 406 is coupled to a swivel pin assembly 412, which is in turn coupled to a handle end fitting 414. The handle end fitting is fixedly attached to the end of the handle 210.

As shown in more detail in FIG. 5, the swivel pin assembly 412 comprises a pin 500 which extends through an eyelet portion 502 of the handle end fitting 414. The pin 500 also extends through a spacer sleeve 504 which is provided for maintaining a constant space between the eyelet portion 502 of the handle end fitting 414 and the lever arm 406. The swivel pin assembly 412 further includes a spherical ball assembly 506 which is press fit within the aperture of the apertured end 410 of the lever arm 406. The spherical ball assembly includes a retaining sleeve 508 and a spherical ball 510 that is rotatably retained within the retaining sleeve 508. The spherical ball may be disposed within the retaining sleeve 508 by machining the two from a common metal workpiece as is known in the art. The retaining sleeve 508 is sized to be pressfit within the apertured end 410 of the lever arm 406. the pin 500 extends through at through-hole-bore 512 in the spherical ball 510 and is threadably attached to a nut 514. The pin 500 is thereby enabled to undergo rotary motion in every direction, relative to the lever arm 406, within a limited range. The range of motion of the pin 500 is limited by the boundary created by sleeve 412.

In operation, rotation of the handle 208 causes displacement of the apertured end 410 of the lever arm 406 and, because of the above described motion of swivel pin 500, the handle end fitting 408 is rotated, thus rotating the latched end portion 218 of the handle about the latching axis "Y." As described above, rotation of the latched end portion 218 about the latching axis "Y" results in unlatching the door 200 to allow the door to rotate clockwise relative to the frame 100. Accordingly, continued rotation of the handle 208 results in clockwise rotation of the door 200 about the mating axis "X" and removal of the door from the frame 100.

The interior side of the door 200 includes peripheral grooves 416 and 418 which extend about the periphery of the door 200. The grooves 416 and 418 are provided for receiving a resilient member (not shown) which will mate with the sealing plane 112 to provide the seal between adjacent fuel compartments. As discussed above, the present invention includes apparatus for adjusting the camming force between the door 200 and the frame 100 to minimize wear to mating parts.

With reference to FIG. 6, the frame camming tabs 114 include an adjustable compression assembly 600 for engaging the door camming tab 202 to compress the resilient member seated within the sealing grooves 418 and 416 to the sealing plane 112 of the frame 100. The compression assembly 600 includes a locating stud 602 which threadably engages a stud retaining member 604, the stud retaining member being fixedly mounted to the frame camming tab 114. During the initial installation of the door assembly, the locating studs 602 are adjusted to compress the resilient member to the sealing plane 112 with the necessary force to create a seal which will withstand the pressure that is expected between the adjacent fuel cells.

The door 200 may also include positioning studs 606 which engage the retaining member 604 when the door 200 is latched to the frame 100 and thereby position the door within the frame. The positioning studs 606 also provide kinetic feedback to the operator to indicate that the door is properly positioned.

The sectional view of FIG. 7 illustrates the angular relationship between the locating stud 602 and the door camming tab 202. Particularly, the door camming tab is angled relative to the locating stud to allow the door 200 to be compressed to the sealing plane 112.

It will be appreciated that, although specific embodiments of the invention have been described herein for purposes of illustrating, various modifications may be made without departing from the true spirit and scope of the invention. Accordingly, the invention is not limited except as by the appended claims.

I claim:

1. A door assembly for use with a fuel cell rib, said assembly comprising:
   an access door having exterior and interior sides;
   frame means for receiving said door, said frame means being attachable to the fuel cell rib, said frame means including an interior opening therethrough and a plurality of frame tabs spaced about the interior opening of said frame means;
   a plurality of door tabs attached to the periphery of said door in spaced relation, said door tabs for engaging respective ones of said plurality of frame tabs to compress said door to said frame means;
   a shaft extending through said door with its longitudinal axis positioned generally transverse to said door, said shaft having an exterior shaft portion projecting from the exterior side of said door and an interior shaft portion projecting from the interior side of said door;
   a first handle fixedly attached to said exterior shaft portion to rotate said shaft about its longitudinal axis;
   a lever arm having a first end fixedly attached to said interior shaft portion and a second end remote from said interior shaft portion such that the second end of said lever arm is displaced in response to rotation of said shaft, said second end including a spherical ball joint assembly mounted therein, said spherical ball joint assembly including a spherical ball rotatably mounted in said assembly and having a hole through the center thereof;
   a swivel pin having a translating end portion and a rotating end portion, said translating end portion being positionable through the hole of said spherical ball and including a nut threadably mateable with the translating end portion of said pin for connecting said pin to said spherical ball assembly such that said pin moves in more than two dimensions relative to said lever arm;
   an elongate second handle having a latch end portion a free end portion remote from said latch end portion and an intermediate portion joining said free end portion to said latch end portion, said latch end portion being mounted to said door such that movement of said latch end portion relative to said door is restricted to rotation of said latch end portion about its longitudinal axis, said intermediate portion being bent such that said latch end portion is rotated about its longitudinal axis in response to displacement of said free end portion;
   a handle end fitting fixedly attached to said latch end portion of said second handle for mounting said second handle to said rotating end portion of said pin such that displacement of said translating end portion of said pin rotates said latch end portion of said second handle about its longitudinal axis;
   a latch including a latch arm having a biasing portion, a latching portion and a mounted portion intermediate said biasing portion and said latching portion, said mounted portion being pivotally mounted to said frame means, said latch including springs attached to said biasing portion of said latch arm and said frame means for biasing said latching portion toward said latch end portion of said second handle; and
   a latch actuator fixedly attached to said latch end portion of said second handle to rotate in response to rotation of said latch end portion, said fitting having an extended roller portion for engaging said latch arm to move said latch arm away from said second handle and free end second handle for rotation relative to said frame means.

2. A door assembly for use with a fuel cell rib, said assembly comprising:
   a door having exterior and interior sides and including a shaft extending therethrough;
   frame means attachable to the fuel cell rib for coupling the door assembly to the fuel cell, said frame means including a central opening, said door being adapted to rotationally engage and disengage said frame means to provide selective access to the fuel cell;
   first handle means operable from the exterior side of said door for rotating said shaft;
   a latch handle fixedly attached to the interior side of said door such that movement of said latch handle relative to said door is limited to rotation about the longitudinal axis of said latch handle and such that said door rotates about a transverse axis that is transverse to said door, relative to said frame means, in response to rotation of said latch handle about the transverse axis;
   linkage means coupling said shaft to said latch handle for rotating said latch handle about its longitudinal axis in response to a first predetermined angular rotation of said shaft and for rotating said latch handle about the transverse axis in response to a second predetermined angular rotation of said shaft; and
   latch means for latching said latch handle such that said door is prevented from rotating relative to said frame means, said latch means being responsive to rotation of said latch handle about its longitudinal axis for freeing said latch handle such that said door is not prevented from rotating relative to said frame means.

3. A door assembly as recited in claim 2 wherein said shaft includes an interior shaft portion projecting from the interior side of said door and wherein said linkage means comprises:
   lever means having a first end fixedly attached to said interior shaft portion of said shaft and a second end remote from said shaft such that the second end of said lever means is displaced in response to rotation of said shaft; and
   swivel means responsive to a first predetermined displacement of the second end of said lever means for rotating said latch handle about is longitudinal axis and responsive to a second predetermined displacement of the second end of said lever means for rotating said latch handle about the transverse axis.

4. A door assembly as recited in claim 3 wherein said swivel means comprises:
   a pin having a translating end portion and a rotating end portion; and
   a spherical ball joint for coupling said pin to said lever means such that said pin may move in more than two dimensions relative to said lever means.

5. A door assembly as recited in claim 4 wherein said latch means comprises:
   a latch including a latch arm having a biasing portion, a latching portion and a mounted portion intermediate said biasing portion and said latching portion, said latching portion for engaging said latch handle to prevent said latch handle from rotating about the transverse axis, said mounted portion being pivotally mounted to said frame means, said latch including springs attached to said biasing portion of aid latch arm and said frame means for biasing said latching portion toward said latch handle; and
   a latch actuator fixedly attached to said latch handle for rotating in response to rotation of said latch handle, said latch actuator having an extended finger portion for engaging said latch arm to move said latch arm away from said latch handle to free said latch handle such that said latch handle can rotate about the transverse axis.

6. A door assembly as recited in claim 5, further comprising second handle means operable from the interior side of said door for rotating said latch handle about its longitudinal axis to free said latch handle from said latch means and, thereafter, for rotating said latch handle about the transverse axis such that said door is rotated about the transverse axis.

7. A door assembly as recited in claim 6 wherein said second handle means comprises a free end handle fixedly attached to said latch handle at a first predetermined angle such that said latch handle is rotated about its longitudinal axis in response to displacement of said free end handle.

8. A door assembly as recited in claim 6 wherein said second handle means comprises a free end handle having an intermediate portion fixedly attached to said latch handle and a free end portion remote from said latch handle, said intermediate portion being bent such that the longitudinal axis of said latch handle and said free end portion are substantially parallel and such that said latch handle is rotated about its longitudinal axis in response to displacement of said free end portion.

9. A door assembly as recited in claim 2, further comprising second handle means operable from the interior side of said door for rotating said latch handle about its longitudinal axis to free said latch handle from said latch means and, thereafter, for rotating said latch handle about the transverse axis such that said door is rotated about the transverse axis.

10. A door assembly as recited in claim 9 wherein said second handle means comprises a free end handle fixedly attached to said latch handle at a first predetermined angle such that said latch handle is rotated about its longitudinal axis in response to displacement of said free end handle.

11. A door assembly as recited in claim 9 wherein said second handle means comprises a free end handle having an intermediate portion fixedly attached to said latch handle and a free end portion remote from said latch handle, said intermediate portion being bent such that the longitudinal axes of said latch handle and said free end portion are substantially parallel and such that said latch handle is rotated about its longitudinal axis in response to displacement of said free end portion.

12. A door assembly as recited in claim 2 wherein said latch means comprises:

13. A door assembly as recited in claim 2, further comprising engagement means responsive to a predetermined angular rotation of said door in a first direction for compressibly engaging said door with said frame thereby preventing further rotation of said door in the first direction.

14. A door assembly as recited in claim 13 wherein said engagement means comprises:
   a plurality of frame tabs fixedly attached to project inward from the central opening of said frame means and positioned in spaced relation;
   a plurality of door tabs fixedly attached to project outward from the periphery of said door and positioned to mate with respective ones of said frame tabs; and
   compression means responsive to engagement of said door tabs and said frame tabs for compressing said door to said frame to substantially limit the rotation of said door in the first direction.

15. A door assembly as recited in claim 14 wherein said compression means comprises a plurality of locating studs each fixedly attached to a respective one of said plurality of frame tabs and positioned to project toward said door tabs, said door tabs being beveled such that upon engagement with said locating studs and further rotation in the first direction said door is compressed against said frame.

16. A door assembly as recited in claim 15 wherein the positioning of said locating studs is adjustable such that the amount of compression of said door may be adjusted.

17. A door assembly as recited in claim 16 wherein said shaft includes an interior shaft portion projecting from the interior side of said door and wherein said linkage means comprises:
   lever means having a first end fixedly attached to said interior shaft portion of said shaft and a second end remote from said shaft such that the second end of said lever means is displaced in response to rotation of said shaft; and
   swivel means responsive to a first predetermined displacement of the second end of said lever means for rotating said latch handle about its longitudinal axis and responsive to a second predetermined displacement of the second end of said lever means for rotating said latch handle about the transverse axis.

18. A door assembly as recited in claim 17 wherein said swivel means comprises:
   a pin having a translating end portion and a rotating end portion; and
   a spherical ball joint for coupling said pin to said lever means such that said pin may move in more than two dimensions relative to said lever means.

19. A door assembly as recited in claim 18, further comprising second handle means operable from the interior side of said door for rotating said latch handle about its longitudinal axis to free said latch handle from aid latch means and, thereafter, for rotating said latch handle about the transverse axis such that said door is rotated about the transverse axis.

20. A door assembly as recited in claim 19 wherein said latch means comprises:
   a latch including a latch arm having a biasing portion, a latching portion and amounted portion intermediate said biasing portion and said latching portion, said latching portion for engaging said latch handle to prevent said latch handle from rotating about the transverse axis, said mounted portion being pivotally mounted to said frame means, said latch including springs attached to said biasing portion of said latch arm and said frame means for biasing said latching portion toward said latch handle; and
   a latch actuator fixedly attached to said latch handle for rotating in response to rotation of said latch handle, said latch actuator having an extended finger portion for engaging said latch arm to move said latch arm away from said latch handle to free said latch handle such that said latch handle can rotate about the transverse axis.

* * * * *

UNITED STATES PATENT AND TRADEMARK OFFICE
CERTIFICATE OF CORRECTION

PATENT NO. : 4,848,034

DATED : July 18, 1989

INVENTOR(S) : James W. Pace

It is certified that error appears in the above-identified patent and that said Letters Patent is hereby corrected as shown below:

In claim 3, column 7, line 15, delete "is" and substitute therefor --its--.

In claim 5, column 7, line 38, delete "aid" and substitute therefor --said--.

In claim 8, column 7, line 65, delete "axis" and substitute therefor --axes--.

In claim 19, column 9, line 18, delete "aid" and subsitute therefor --said--.

In claim 20, column 10, line 4, delete "amounted" and substitute therefor --a mounted--.

UNITED STATES PATENT AND TRADEMARK OFFICE
CERTIFICATE OF CORRECTION

PATENT NO. : 4,848,034
DATED : July 18, 1989
INVENTOR(S) : James W. Pace

It is certified that error appears in the above-identified patent and that said Letters Patent is hereby corrected as shown below:

In claim 12, column 8, line 24, following "comprises" insert --a latch including a latch arm having a biasing portion, a latching portion and a mounted portion intermediate said biasing portion and said latching portion, said latching portion for engaging said latch handle to prevent said latch handle from rotating about the transverse axis, said mounted portion being pivotally mounted to said frame means, said latch including springs attached to said biasing portion of said latch arm and said frame means for biasing said latching portion toward said latch handle; and
  a latch actuator fixedly attached to said latch handle for rotating in response to rotation of said latch handle, said latch actuator having an extended finger portion for engaging said latch arm to move said latch arm away from said latch handle to free said latch handle such that said latch handle can rotate about the transverse axis.--.

Signed and Sealed this

Nineteenth Day of June, 1990

Attest:

HARRY F. MANBECK, JR.

*Attesting Officer*    *Commissioner of Patents and Trademarks*